United States Patent
Jung (10) Patent No.: US 9,686,746 B2
(45) Date of Patent: Jun. 20, 2017

(54) TELEMATICS TERMINAL AND TELEMATICS CENTER FOR PREVENTING VEHICLE DISCHARGE AND CONTROL METHOD THEREOF

(71) Applicant: Hyundai Motor Company, Seoul (KR)

(72) Inventor: Jae Hoon Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 37 days.

(21) Appl. No.: 14/809,237

(22) Filed: Jul. 26, 2015

(65) Prior Publication Data

US 2016/0157179 A1    Jun. 2, 2016

(30) Foreign Application Priority Data

Nov. 27, 2014 (KR) .................. 10-2014-0167292

(51) Int. Cl.
*H04W 52/02* (2009.01)
*H04L 29/08* (2006.01)

(52) U.S. Cl.
CPC ......... *H04W 52/0261* (2013.01); *H04L 67/12* (2013.01); *Y02B 60/50* (2013.01)

(58) Field of Classification Search
CPC .............. B60L 11/1824; B60L 2240/70; B60L 2250/12; B60L 2250/16; H04W 52/0241; H04L 12/12; H04L 12/40039; H04L 2012/40273; H04L 67/12
USPC ..... 701/29.1, 1–2, 22, 32.7; 455/9, 420, 466
See application file for complete search history.

(56) References Cited

U.S. PATENT DOCUMENTS

| 8,000,842 B2 | 8/2011 | Yi et al. |
| 8,849,499 B2 * | 9/2014 | Profitt-Brown ........ B60K 35/00 340/426.18 |
| 9,462,545 B2 * | 10/2016 | Kleve ............... H04W 52/0209 |
| 2005/0143146 A1 | 6/2005 | Kim |
| 2012/0226410 A1 | 9/2012 | Snider |

FOREIGN PATENT DOCUMENTS

| EM | 1550584 A2 | 7/2005 |
| JP | 2006-160176 A | 6/2006 |
| JP | 2007-015580 A | 1/2007 |
| JP | 2008-265518 A | 11/2008 |
| KR | 10-2006-0062641 A | 6/2006 |
| KR | 10-2006-0063592 A | 6/2006 |
| KR | 10-0597519 B1 | 7/2006 |
| KR | 10-2010-037677 A | 4/2010 |
| KR | 10-1026557 B1 | 3/2011 |

* cited by examiner

*Primary Examiner* — Dalena Tran
(74) *Attorney, Agent, or Firm* — Mintz Levin Cohn Ferris Glovsky and Popeo, P.C.; Peter F. Corless (57) ABSTRACT

A telematics terminal includes: a modem unit communicating with a telematics center; and a controller i) monitoring an amount of current consumption by the modem unit in a sleep mode in which the telematics terminal is operated at low power, ii) when the monitored amount of current consumption exceeds a designated current consumption amount and the modem unit is in danger of electrical discharge, transmitting a vehicle discharge danger message indicating a current position of the telematics terminal to the telematics center, and iii) when a vehicle control command corresponding to the vehicle discharge danger message is received from the telematics center, performing an operation corresponding to the vehicle control command.

15 Claims, 5 Drawing Sheets

TELEMATICS TERMINAL AND TELEMATICS CENTER FOR PREVENTING VEHICLE DISCHARGE AND CONTROL METHOD THEREOF

CROSS-REFERENCE TO RELATED APPLICATION

This application claims the benefit of and priority to Korean Patent Application No. 10-2014-0167292, filed on Nov. 27, 2014, which is hereby incorporated by reference as if fully set forth herein.

BACKGROUND OF THE DISCLOSURE

Field of the Disclosure

The present disclosure relates generally to a telematics terminal and telematics center for preventing vehicle discharge and a control method thereof, and more particularly, to a telematics terminal and telematics center for preventing vehicle discharge and a control method thereof in which the current consumption amount of a modem unit provided in the telematics terminal is monitored so as to prevent electric discharge of a vehicle.

Discussion of the Related Art

Due to advances in electronic control technology, vehicle systems are gradually becoming more sophisticated. In particular, various vehicular devices, which were conventionally operated through mechanical methods, are now operated by electrical methods for the enhancement of driver convenience and safety. For instance, telematics is a compound word of telecommunication and informatics referring to a system that operates through a communication terminal mounted in the vehicle for analyzing various phenomena occurring in the vehicle and collecting various pieces of information necessary for driving. Telematics information, which is directed to a wireless data service for providing information during movement of transport units, may be transmitted and received using computers installed in transportation equipment, such as vehicles, aircrafts, ships, wireless communication technology, GPSs, and technology for exchanging text and voice signals over the Internet.

In order to utilize a telematics service, a telematics terminal capable of performing mobile communication with a global positioning system (GPS) must be installed in the vehicle. The telematics service applies mobile communication technology and location technology to vehicles and can thus provide information to drivers regarding vehicle accidents, theft sensing, driving path guidance, traffic and living information, games, and the like.

As an example, if a vehicle breaks down, a telematics terminal installed the vehicle enters a sleep mode in which the vehicle is driven at low power. In the sleep mode, the telematics terminal periodically receives a reception signal (Rx signal) alone. However, when the telematics terminal is disposed in a weak electric field or a shadow zone in which wireless communication is difficult, the telematics terminal not only receives the Rx signal but also transmits a transmission signal (Tx signal) to an external device. However, conventionally, if a vehicle is operated in a sleep mode for a long time, current from a telematics modem is continuously consumed and the vehicle may eventually be electrically discharged.

SUMMARY OF THE DISCLOSURE

Accordingly, the present disclosure is directed to a telematics terminal and telematics center for preventing vehicle discharge and a control method thereof that substantially obviate one or more problems due to limitations and disadvantages of the related art.

An object of the present disclosure is to provide a telematics terminal and telematics center for preventing vehicle discharge and a control method thereof in which current consumption of a vehicle modem is effectively managed. Another object of the present disclosure is to provide a telematics center which collects information regarding areas having a high possibility of electrical discharge from a plurality of vehicles and, if a vehicle is parked in a corresponding area, transmits a vehicle control command to the vehicle using the collected information. Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to embodiments of the present disclosure, a telematics terminal includes: a modem unit communicating with a telematics center; and a controller i) monitoring an amount of current consumption by the modem unit in a sleep mode in which the telematics terminal is operated at low power, ii) when the monitored amount of current consumption exceeds a designated current consumption amount and the modem unit is in danger of electrical discharge, transmitting a vehicle discharge danger message indicating a current position of the telematics terminal to the telematics center, and iii) when a vehicle control command corresponding to the vehicle discharge danger message is received from the telematics center, performing an operation corresponding to the vehicle control command.

The controller may further: calculate an allowable current consumption amount until the modem unit is electrically discharged; monitor the amount of current consumption by the modem unit in real-time; and when the monitored amount of current consumption amount of the modem unit is close to the allowable current consumption amount, automatically turn off power of the modem unit.

The controller may further: monitor an amount of current consumption by at least one electronic control unit (ECU); generate a list of each ECU of the at least one ECU for which the respective monitored amount of current consumption exceeds the designated current consumption amount; and transmit the list to the telematics center.

A mean current consumption amount A until the modem unit is electrically discharged may be determined by Equation 1: $A=C/T$, where C represents an allowable current consumption amount until the modem unit is electrically discharged, and T represents a predetermined time; and the controller may further: divide the predetermined me T into a plurality of time sections; and when the amounts of current consumption in each of the plurality of time sections exceed the mean current consumption amount A at least once, transmit the vehicle discharge danger message indicating the current position of the telematics terminal to the telematics center.

The predetermined time T may be set according to user input.

The vehicle control command may be a control command to turn off power of the modem unit; and the controller may further turn off power of the modem unit when the control command is received.

Furthermore, according to embodiments of the present disclosure, a telematics center includes: a communication unit receiving a vehicle discharge danger message from a registered telematics terminal indicating a current position of the telematics terminal; and a controller i) transmitting a warning message corresponding to the vehicle discharge danger message to an external mobile terminal through the communication unit and ii) when a command corresponding to the warning message is received from the external mobile terminal, transmitting the command to the telematics terminal.

The vehicle discharge danger message may include discharge danger information of a modem unit of the telematics terminal.

The vehicle discharge danger message may include discharge danger information of at least one ECU in communication with the telematics terminal.

The command transmitted to the telematics terminal may be a command to turn off power of the telematics terminal.

The command transmitted to the telematics terminal may be a command to turn off power of at least one ECU having a possibility of electrical discharge.

Furthermore, according to embodiments of the present disclosure, a telematics center includes: a communication unit receiving at least one vehicle discharge danger message from at least one registered telematics terminal indicating a current position of the at least one telematics terminal; and a controller i) collecting the at least one received vehicle discharge danger message based on the current position of the at least one telematics terminal and ii) when a designated vehicle is parked in an area having a possibility of electrical discharge, transmitting a warning indication message to an external mobile terminal through the communication unit.

The at least one vehicle discharge danger message may include discharge danger information of a modem unit loaded in each of the at least one telematics terminal.

The at least one vehicle discharge danger message may include discharge danger information of at least one ECU loaded in each of the at least one telematics terminal.

The warning indication message may be a vehicle movement recommending message.

It is to be understood that both the foregoing general description and the following detailed description of the present disclosure are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Reference will now be made in detail to embodiments of the present disclosure, examples of which are illustrated in the accompanying drawings. In the drawings, the same or similar elements are denoted by the same reference numerals even though they are depicted in different drawings, and a detailed description thereof will be omitted. The suffixes "module" and "unit" in elements used in the description below are given or used together only in consideration of ease in preparation of the specification and do not have distinctive meanings or functions. In the following description of embodiments of the present disclosure, a detailed description of known functions and configurations incorporated herein will be omitted when it may make the subject matter of the present disclosure rather unclear.

Further, in description of elements of the present disclosure, the terms "first", "second", etc. may be used. These terms are used only to discriminate one element from other elements, and the nature, order, or sequence of the corresponding element is not limited by these terms. If it is stated that an element is "connected to", "combined with", or "coupled with" another element, it will be understood that the former may be directly connected to or combined with the latter or other elements may be interposed between the two elements. On the other hand, if it is stated that an element is "connected directly to", "combined directly with", or "coupled directly with" another element, it will be understood that other elements are not interposed between the two elements.

A singular expression may include a plural expression unless they have different meanings in the context. That is, as used herein, the singular forms "a", "an" and "the" are intended to include the plural forms as well, unless the context clearly indicates otherwise.

In the following description of the present disclosure, it will be understood that the terms "including" and "having" mean presence of features, numbers, stages, operations, elements, parts stated in the specification or combinations thereof and does not exclude presence of one or more other features, numbers, stages, operations, elements, parts, or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 1:
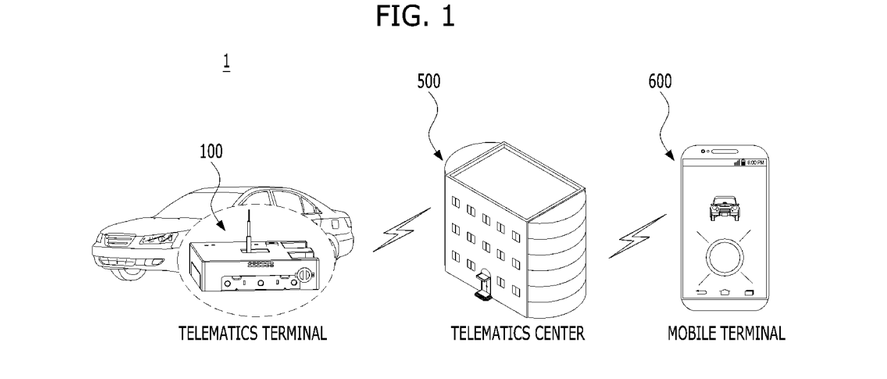
FIG. 1 is a view schematically illustrating an electrical discharge prevention system including a telematics terminal preventing electrical discharge of a vehicle in accordance with embodiments of the present disclosure.

Referring now to the disclosed embodiments, FIG. 1 is a view schematically illustrating an electrical discharge prevention system including a telematics terminal preventing electrical discharge of a vehicle in accordance with embodiments of the present disclosure.

As shown in FIG. 1, the electrical discharge prevention system may include a telematics terminal 100, a telematics center 500, and a mobile terminal 600.

The telematics terminal 100 enters a sleep mode if the vehicle breaks down. In the sleep mode, the telematics terminal 100 is operated at low power. In more detail, in the sleep mode, the telematics terminal 100 periodically receives a reception signal (Rx signal) alone. However, when the telematics terminal 100 is disposed in a weak electric field or a shadow zone in which wireless communication is difficult, the telematics terminal 100 not only receives the Rx signal but also transmits a transmission signal (Tx signal) to the outside and thus, the current consumption amount of a communication modem increases. Thereby, the communication modem is in danger of electrical discharge. This is a feature of general modems. As the power of the communication modem is electrically discharged, vehicle remote control may be difficult and further, if a vehicle battery is electrically discharged, vehicle driving may be difficult. The present disclosure is proposed to prevent such danger.

The telematics terminal 100 may also monitor the current consumption amount of the modem. If the monitored current consumption amount of the modem exceeds a designated current consumption amount and the modem is in danger of electrical discharge, the telematics terminal 100 may transmit a vehicle discharge danger message to the telematics center 500. Particularly, the telematics terminal 100 may receive position information from a global position system (GPS) and transmit the received position information to the telematics center 500. The telematics terminal 100 may transmit a vehicle discharge danger message including the corresponding position information to the telematics center 500.

The telematics center 500 is a center which may communicate with the telematics terminal 100 and perform vehicle remote control (e.g., remote start, remove vehicle air-conditioning, and the like). The telematics center 500 may register the telematics terminal 100 prior to providing the telematics service to the telematics terminal 100. The telematics center 500 may receive the vehicle discharge danger message from the telematics terminal 100 and transmit a vehicle discharge danger message to the mobile terminal 600 registered in advance.

The mobile terminal 600 may transmit feedback of a warning message received from the telematics center 500 to the telematics center 500. In more detail, the mobile terminal 600 may request the telematics center 500 to generate a vehicle control command and to transmit the generated vehicle control command to the telematics terminal 100. Particularly, the feedback may be triggered by user input. For example, user input may be sensed through a touch-screen of the mobile terminal 600.

As an example, the feedback may include a command for turning off the telematics terminal 100, a command for turning off an ECU and the like. Further, the feedback may include a confirmation menu to simply transmit an acknowledgement (ACK) signal. If the telematics center 500 transmits a message indicating a discharge danger area to the mobile terminal 600, the mobile terminal 600 may transmit an ACK signal to the telematics center 500 through user input corresponding to the ACK signal (e.g., click of a confirmation button).

The mobile terminal 600 may provide various menus to remote control the vehicle. That is, the mobile terminal 600 may provide menus to provide a vehicle door opening function, an air conditioning triggering function, a vehicle start triggering function and the like to a user. The telematics center 500 may generate a vehicle control command corresponding to the feedback received from the mobile terminal 600 and transmit the generated vehicle control command to the telematics terminal 100. The vehicle control command may include a command to turn power of the modem unit off or a command to decrease power of the modem unit.

Further, the vehicle control command may be a command to control other ECUs as well as the modem unit. For example, other ECUs may be a smart key, an indoor lamp, an air conditioning device and the like. If the telematics terminal 100 receives a command to control an ECU, the telematics terminal 100 may control the corresponding ECU through CAN communication. The telematics terminal 100 may receive a vehicle control command from the telematics center 500 and perform an operation corresponding to the received vehicle control command.

Although the disclosure describes the mobile terminal 600 as using the telematics center 500 to control the telematics terminal 100, the mobile terminal 60 may me implemented so as to directly control the telematics terminal 100.

Figure 2:
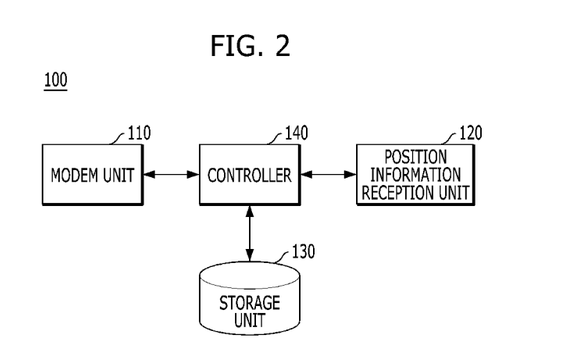
FIG. 2 is a block diagram of a telematics terminal in accordance with embodiments of the present disclosure.

FIG. 2 is a block diagram of a telematics terminal in accordance with embodiments of the present disclosure.

As shown in FIG. 2, the telematics terminal 100 may include a modem unit 110, a position information reception unit 120, a storage unit 130, and a controller 140.

Hereinafter, with reference to FIG. 2, a detailed configuration of the telematics terminal will be described. FIG. 2 is a block diagram of a telematics terminal in accordance with embodiments of the present disclosure. Elements shown in FIG. 2 are not essential in implementation of the telematics terminal and thus, the telematics terminal 100 described in the disclosure may actually include a number of elements greater or less than the illustrated elements.

The modem unit 110 may include one or more modules enabling wireless communication between the telematics terminal 100 and a wireless communication system, the telematics terminal 100 and another telematics terminal 100, or the telematics terminal 100 and an external center. Further, the modem unit 110 may include one or more modules connecting the telematics terminal 100 to one or more networks. Although the disclosure describes the modem unit 110 and the position information reception unit 120 as being separated from each other, the modem unit 110 and the position information reception unit 120 may be integrated into a telematics unit (not shown) in implementation.

The modem unit 110 may communicate with the telematics center 500. In general, the modem unit 110 may communicate with the telematics center 500 using wireless communication. The modem unit 110 may transmit and receive a wireless signal to and from at least one of a base station, an external terminal, and a center on a mobile communication network constructed according to technical standards or communication schemes for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSDPA), Long Term Evolution (LTE), Long Term Evolution-Advanced (LTE-A), and the like). The wireless signal may include a voice call signal, a video call signal or various types of data according to text/multimedia message transmission and reception. Further, the modem unit 110 may include a module for wireless Internet connection but a detailed description thereof will be omitted.

The position information reception unit 120 serves to acquire the position (i.e., the current position) of the telematics terminal 100. For example, the position of the telematics terminal 100 may be acquired using a signal transmitted from a GPS satellite through the position information reception unit 120. Further, the telematics terminal 100 may support Wi-Fi, Bluetooth, Wi-Fi direct, and the like, and a detailed description thereof will be omitted.

The storage unit 130 may store data supporting various functions of the telematics terminal 100. The storage unit 130 may store a plurality of application programs or applications executed in the telematics terminal 100, and data and commands to operate the telematics terminal 100. At least some of these application programs may be downloaded from an external center through wireless communication. Further, at least some of these application programs for basic functions of the telematics terminal 100 (e.g., call reception and transmission functions and message reception and transmission functions) may be preinstalled on the telematics terminal 100. The application programs may be stored in the storage unit 130, installed on the telematics terminal 100, and driven by the controller 180 so as to perform the operation (i.e., function) of the telematics terminal 100.

The storage unit 130 may store programs to operate the controller 180 and temporarily store pieces of input/output data (e.g., phonebooks, messages, still images, moving pictures and the like). The storage unit 130 may store data regarding various patterns of vibration and sound which are output when a touch on a touchscreen is input.

The storage unit 130 may include at least one storage medium of a flash memory type storage unit, a hard disk type storage unit, a solid state disk (SSD) type storage unit, a silicon disk drive (SDD) type storage unit, a multimedia card micro type storage unit, a card type storage unit (for example, an SD or XD storage unit), a random access memory (RAM), a static random access memory (SRAM), a read-only memory (ROM), an electrically erasable programmable read-only memory (EEPROM), a programmable read-only memory (PROM), a magnetic storage unit, a magnetic disk, and an optical disc. The telematics terminal 100 may be operated in relation with a web storage performing the storage function of the storage unit 170 over the Internet.

The controller 140 controls the overall operation of the telematics terminal 100 in addition to operations regarding the application programs. The controller 140 may process signals, data, or information, input or output through the above-described elements, or drive the application programs stored in the storage unit 170, thus processing or providing proper information or functions to a user.

The controller 140 may receive current position information of the telematics terminal 100 through the position information reception unit 120. The current position information may be received through GPS reception. The controller 140 may monitor the current consumption amount of the modem unit 110 in the sleep mode in which the telematics terminal 100 is driven at low power. For example, the controller 140 may calculate an allowable current consumption amount C until the modem unit 110 of the telematics terminal 100 is electrically discharged. That is, the controller 140 may measure the amount of current consumed by the modem unit 110 until the modem unit 110 is electrically discharged.

Thereafter, a time T for which the sleep mode is carried out may be set. The time T may be set in advance by the controller 140 or be set through user input. Otherwise, the controller 140 may ask the telematics center 500 about the time T taken for the modem unit 110 to be electrically discharged. The telematics center 500, at a point where the telematics terminal 100 is located currently, may judge a time, corresponding to a threshold current consumption amount until the modem unit 110 is electrically discharged, using information collected from other telematics terminals and provide the time to the telematics terminal 100.

If the controller 140 calculates the allowable current consumption amount C until the modem unit 110 is electrically discharged and the predetermined time T, a mean current consumption amount A may be determined as C/T. The controller 140 may divide the predetermined time T into a plurality of time sections and, if the current consumption amounts in the respective divided time sections exceed the mean current consumption amount A at least once, judge that the modem unit 110 is in danger of electrical discharge. The time sections may be sections acquired by dividing the predetermined time T into N sections. In addition, if the current consumption amounts in all the divided time sections exceed the mean current consumption amount A, the controller 140 may judge that the modem unit 110 is in danger of electrical discharge.

The controller 140 may determine whether or not various ECUs are in danger of electrical discharge in addition to the modem unit 110. For example, the controller 140 may determine whether or not a smart key, an indoor lamp, an air conditioning device and the like are in danger of electrical discharge. The controller 140 may monitor the current consumption amount of an ECU and, if the monitored current consumption amount exceeds a designated current consumption amount and the ECU is in danger of electrical discharge, transmit a vehicle discharge danger message including the current position information of the telematics terminal 100 to the telematics center 500.

The controller 140 may generate and/or transmit a list of ECUs in danger of electrical discharge to the telematics center 500. In this case, the telematics center 500 may transmit the list of ECUs in danger of electrical discharge to the mobile terminal 600 and the mobile terminal 600 may turn power of all or some ECUs of the list of ECUs in danger of electrical discharge.

Although the disclosure exemplarily described the controller 140 as generating a list of ECUs in danger of electrical discharge, this is only one embodiment and the telematics center 500 may generate a list of ECUs in danger of electrical discharge and provide the list of ECUs in danger of electrical discharge to the mobile terminal 600.

If the monitored current consumption amount exceeds a designated current consumption amount and the modem unit 110 is in danger of electrical discharge, the controller 140 may transmit a vehicle discharge danger message including the current position information of the telematics terminal 100 to the telematics center 500. Further, if the controller 140 receives a vehicle control command from the telematics center 500, the controller 140 may perform an operation corresponding to the vehicle control command. For example, the telematics center 500 may transmit a modem unit power off command to the telematics terminal 100 and the controller 140 performs an operation of the modem unit 110 corresponding to such a command.

The controller 140 may also calculate an allowable current consumption amount until the modem unit 110 is electrically discharged, monitor the current consumption amount of the modem unit 110 in real time, and, if the current consumption amount of the modem unit 110 is close to the allowable current consumption amount, automatically turn off the power of the modem unit 110. This case corresponds to a case in that the telematics terminal 100 spontaneously prevents electrical discharge.

The telematics terminal 100 may interwork with an audio-video-navigation system (AVN). The telematics terminal 100 may display information of the telematics unit through a display unit (not shown) provided in the AVN.

Figure 3:
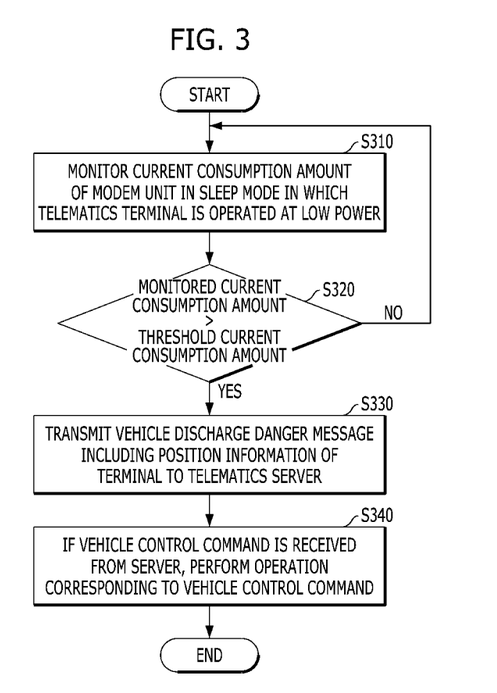
FIG. 3 is a flowchart illustrating a control method of a telematics terminal in accordance with embodiments of the present disclosure.

FIG. 3 is a flowchart illustrating a control method of a telematics terminal in accordance with embodiments of the present disclosure.

As shown in to FIG. 3, the telematics terminal 100 monitors the current consumption amount of the modem unit 110 in the sleep mode (Operation S310).

Thereafter, if the monitored current consumption amount exceeds a designated current consumption amount and the modem unit 110 is in danger of electrical discharge, the telematics terminal 100 transmits a vehicle discharge danger message including the position information of the telematics terminal 100 to the telematics center 500 (Operations 5320 and S330).

The telematics terminal 100 may calculate an allowable current consumption amount until the modem unit 110 is electrically discharged, monitors the current consumption amount of the modem unit 110 in real-time and, if the current consumption amount of the modem unit 110 is close to the allowable current consumption amount, automatically turn off power of the modem unit 110. That is, the telematics terminal 100 may spontaneously prevent electrical discharge.

Thereafter, if the telematics terminal 100 receives a vehicle control command from the telematics center 500, the telematics terminal 100 performs an operation corresponding to the vehicle control command (Operation S340). Further, the telematics terminal 100 may further include at least one ECU and monitor the current consumption amount of the ECU using a method similar to the monitoring method of the modem unit 110.

A method for measuring the current consumption method has been described above and a detailed description thereof will thus be omitted.

The telematics terminal 100 may be registered in the telematics center 500.

Figure 4:
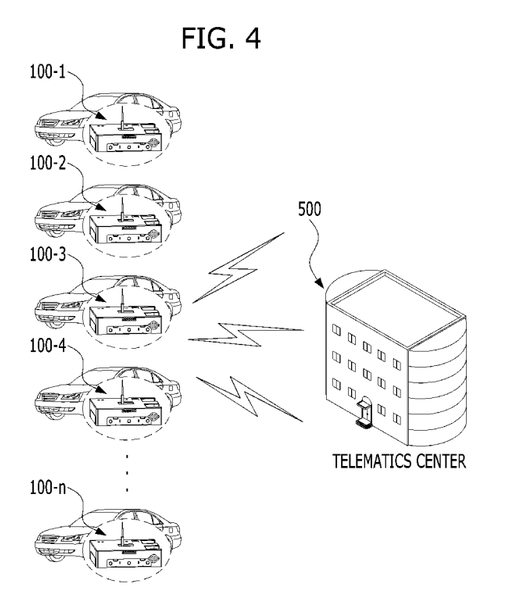
FIG. 4 is a view illustrating a telematics center collecting a vehicle discharge danger message from at least one telematics terminal in accordance with embodiments of the present disclosure.

FIG. 4 is a view illustrating a telematics center collecting a vehicle discharge danger message from at least one telematics terminal in accordance with embodiments of the present disclosure.

As described above, the telematics center 500 may include a communication unit and a controller. With reference to FIG. 4, the telematics center 500 may additionally, or alternatively, receive vehicle discharge danger messages including position information from a plurality of telematics terminals 100 in the sleep mode. The telematics center 500 may collect the position information of the telematics terminals 100 included in the received vehicle discharge danger messages and thus form a database. The controller of the telematics center 500 may collect the received vehicle discharge danger messages according to positions.

Particularly, if a specific telematics terminal 100 is located in an area in high danger of electrical discharge, the telematics center 500 may transmit a warning message to the telematics terminal 100. In this case, convenience of a user of the specific telematics terminal 100 may be enhanced. Further, electrical discharge of a vehicle may be prevented and apparatus efficiency may be improved.

The controller of the telematics center 500 may collect not only discharge danger information of a modem loaded in each of at least one telematics terminal 100, i.e., telematics terminals 100-1~100-*n*, but also discharge danger information of ECUs loaded in each of the telematics terminals 100-1~100-*n*. If a specific vehicle is parked in an area in high danger of electrical discharge, the telematics center 500 may transmit a warning message to the corresponding vehicle. Particularly, the telematics center 500 may transmit a movement recommending message.

Figure 5:
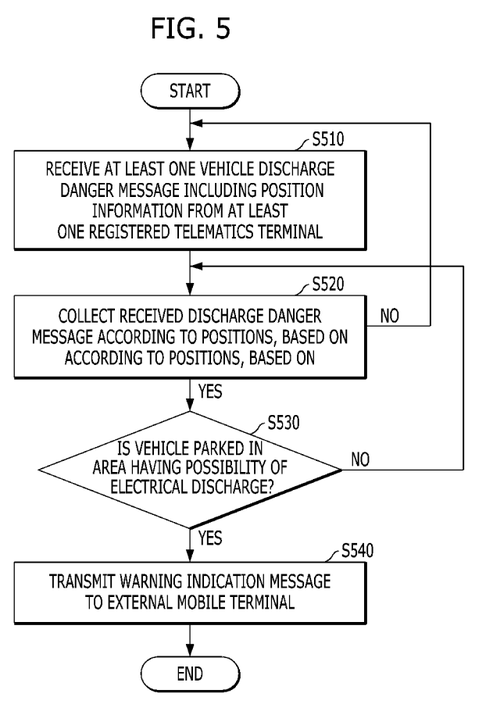
FIG. 5 is a flowchart illustrating a control method of the telematics center of FIG. 4.

FIG. 5 is a flowchart illustrating a control method of the telematics center of FIG. 4.

As shown in FIG. 5, the telematics center 500 receives a vehicle discharge danger message from at least one registered telematics terminal (Operation S510).

Thereafter, if the received vehicle discharge danger message relates to registered vehicle discharge danger messages in terms of position, the telematics center 500 transmits a warning message to an external electronic apparatus (Operation S520). The external electronic apparatus may be one of various apparatuses but will be limited to a mobile terminal simply for convenience of description.

The telematics center 500 may receive discharge danger messages from a plurality of registered telematics terminals. Since position information of the respective telematics terminals is stored in the telematics center 500, the telematics center 500 may analyze an area in high danger of electrical discharge. Thereby, if a random telematics terminal transmits a vehicle discharge danger message to the telematics center 500, the telematics center 500 may simply pass the received discharge danger message to an external electronic apparatus (e.g., a mobile terminal of a vehicle owner) or transmit a warning message to the external electronic apparatus based on an analyzed discharge danger message.

Thereafter, if the telematics center 500 receives feedback corresponding to the warning message from the external electronic apparatus, the telematics center 500 transmits a vehicle control command corresponding to the feedback to the telematics terminal (Operation S540). The present disclosure has described the telematics center 500 as receiving a vehicle discharge danger message from the telematics terminal 100. However, in implementation, although the telematics center 500 does not receive a vehicle discharge danger message and receives only position information of the telematics terminal 100, if the telematics center 500 has information regarding the position of the telematics terminal 100 and a modem unit, ECUs, or a battery of the telematics terminal 100 is in a danger of electrical discharge in a corresponding area, the telematics center 500 may transmit a warning message to the telematics terminal 100.

Further, the telematics center 500 may register at least one telematics terminal in the telematics center 500. Even further, the telematics center 500 may receive a vehicle discharge danger message from at least one telematics terminal and then register the received vehicle discharge danger message in the telematics center 500. Yet even further, if the position of a telematics terminal in the sleep mode is located in an area in danger of electrical discharge, the telematics center 500 may transmit a message recommending vehicle movement to an external electronic apparatus or the telematics terminal.

The telematics center 500 may include the communication unit (not shown) receiving a vehicle discharge danger message from a registered telematics terminal. The controller (not shown) of the telematics center 500 may, if a vehicle discharge danger message received through the communication unit (not shown) relates to registered vehicle discharge danger messages in terms of position, transmit a warning message to an external electronic apparatus and, if feedback corresponding to the warning message is received from the external electronic apparatus, transmit a vehicle control command corresponding to the feedback to the telematics terminal.

Further, the controller (not shown) of the telematics center 500 may register a vehicle discharge danger message received from at least one telematics terminal. The feedback may be selected by user input. For example, an electronic apparatus may include a display having a touch function and an item for vehicle control disposed on the display may be selected by user touch. The electronic apparatus may transmit feedback to perform an operation corresponding to the item for vehicle control to the telematics center 500. Thereby, the telematics center 500 may transmit a vehicle control command corresponding to the feedback to the telematics terminal.

The above-described present disclosure may be implemented by computer readable code stored in a medium in which programs are recorded. Computer readable media include all kinds of recording devices in which data readable by a computer system is stored. For example, computer readable media include a hard disk drive (HDD), a solid state disk (SSD), a silicon disk drive (SDD), a ROM, a RAM, a CD-ROM, a magnetic tape, a floppy disk, an optical data storage device, and the like. Computer readable media may be implemented in a carrier wave type (e.g., transmission over the Internet). Further, a computer may include a controller of a terminal.

As apparent from the above description, in a telematics terminal and telematics center for preventing vehicle discharge and a control method thereof in accordance with embodiments of the present disclosure, electrical discharge of a vehicle is prevented by monitoring a modem unit of the telematics terminal and thus, user convenience, apparatus utilization and efficiency may be improved. Further, information regarding areas in which electrical discharge frequently occurs is collected and, if a vehicle is parked in such an area, the vehicle is controlled using the corresponding information and thus, user convenience may be improved.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A telematics terminal comprising:
a modem unit communicating with a telematics center; and
a controller i) monitoring an amount of current consumption by the modem unit in a sleep mode in which the telematics terminal is operated at low power, ii) when the monitored amount of current consumption exceeds a designated current consumption amount and the modem unit is in danger of electrical discharge, transmitting a vehicle discharge danger message indicating a current position of the telematics terminal to the telematics center, and iii) when a vehicle control command corresponding to the vehicle discharge danger message is received from the telematics center, performing an operation corresponding to the vehicle control command.

2. The telematics terminal according to claim 1, wherein the controller further:
calculates an allowable current consumption amount until the modem unit is electrically discharged;
monitors the amount of current consumption by the modem unit in real-time; and
when the monitored amount of current consumption amount of the modem unit is close to the allowable current consumption amount, automatically turns off power of the modem unit.

3. The telematics terminal according to claim 1, wherein the controller further:
monitors an amount of current consumption by at least one electronic control unit (ECU);
generates a list of each ECU of the at least one ECU for which the respective monitored amount of current consumption exceeds the designated current consumption amount; and
transmits the list to the telematics center.

4. The telematics terminal according to claim 1, wherein:
a mean current consumption amount A until the modem unit is electrically discharged is determined by Equation 1 below:

$$A = C/T,$$

where C represents an allowable current consumption amount until the modem unit is electrically discharged, and T represents a predetermined time; and
the controller further:
divides the predetermined time T into a plurality of time sections; and
when the amounts of current consumption in each of the plurality of time sections exceed the mean current consumption amount A at least once, transmits the vehicle discharge danger message indicating the current position of the telematics terminal to the telematics center.

5. The telematics terminal according to claim 4, wherein the predetermined time T is set according to user input.

6. The telematics terminal according to claim 1, wherein:
the vehicle control command is a control command to turn off power of the modem unit; and
the controller further turns off power of the modem unit when the control command is received.

7. A telematics center comprising:
a communication unit receiving a vehicle discharge danger message from a registered telematics terminal indicating a current position of the telematics terminal; and
a controller i) transmitting a warning message corresponding to the vehicle discharge danger message to an external mobile terminal through the communication unit and ii) when a command corresponding to the warning message is received from the external mobile terminal, transmitting the command to the telematics terminal.

8. The telematics center according to claim 7, wherein the vehicle discharge danger message includes discharge danger information of a modem unit of the telematics terminal.

9. The telematics center according to claim 7, wherein the vehicle discharge danger message includes discharge danger information of at least one ECU in communication with the telematics terminal.

10. The telematics center according to claim 9, wherein the command transmitted to the telematics terminal is a command to turn off power of at least one ECU having a possibility of electrical discharge.

11. The telematics center according to claim 7, wherein the command transmitted to the telematics terminal is a command to turn off power of the telematics terminal.

12. A telematics center comprising:
a communication unit receiving at least one vehicle discharge danger message from at least one registered telematics terminal indicating a current position of the at least one telematics terminal; and
a controller i) collecting the at least one received vehicle discharge danger message based on the current position of the at least one telematics terminal and ii) when a designated vehicle is parked in an area having a possibility of electrical discharge, transmitting a warning indication message to an external mobile terminal through the communication unit.

13. The telematics center according to claim 12, wherein the at least one vehicle discharge danger message includes discharge danger information of a modem unit loaded in each of the at least one telematics terminal.

14. The telematics center according to claim 12, wherein the at least one vehicle discharge danger message includes discharge danger information of at least one ECU loaded in each of the at least one telematics terminal.

15. The telematics center according to claim 12, wherein the warning indication message is a vehicle movement recommending message.

* * * * *